United States Patent
Desai et al.

(10) Patent No.: US 12,022,182 B2
(45) Date of Patent: Jun. 25, 2024

(54) VISUAL FEATURE BASED VIDEO EFFECTS

(71) Applicant: Motorola Mobility LLC, Chicago, IL (US)

(72) Inventors: Rahul Bharat Desai, Hoffman Estates, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 140 days.

(21) Appl. No.: 17/825,679

(22) Filed: May 26, 2022

(65) Prior Publication Data

US 2023/0388620 A1    Nov. 30, 2023

(51) Int. Cl.
*H04N 23/611* (2023.01)
*H04N 5/262* (2006.01)
*H04N 23/45* (2023.01)

(52) U.S. Cl.
CPC ......... *H04N 23/611* (2023.01); *H04N 5/2621* (2013.01); *H04N 23/45* (2023.01)

(58) Field of Classification Search
CPC .... H04N 23/611; H04N 5/2621; H04N 23/45; H04N 23/63
See application file for complete search history.

(56) References Cited

U.S. PATENT DOCUMENTS

| | | | |
|---|---|---|---|
| 5,861,936 A | 1/1999 | Sorensen | |
| 9,628,699 B2 | 4/2017 | Cheng et al. | |
| 9,661,215 B2 | 5/2017 | Sivan | |
| 10,241,545 B1 * | 3/2019 | Richards | G06F 3/013 |
| 10,466,484 B1 * | 11/2019 | Yoon | H04N 13/332 |
| 11,410,331 B2 | 8/2022 | Kassis et al. | |
| 11,561,587 B2 | 1/2023 | Schenone et al. | |
| 11,677,899 B2 | 6/2023 | Vanka et al. | |
| 11,758,260 B1 | 9/2023 | Agrawal et al. | |
| 11,889,178 B2 | 1/2024 | Agrawal et al. | |
| 2008/0080846 A1 | 4/2008 | Grip | |
| 2013/0176208 A1 | 7/2013 | Tanaka et al. | |
| 2015/0163478 A1 | 6/2015 | Geiss et al. | |
| 2016/0156838 A1 | 6/2016 | Cheng et al. | |
| 2016/0261793 A1 | 9/2016 | Sivan | |
| 2017/0123526 A1 * | 5/2017 | Trail | G06V 40/19 |
| 2017/0184846 A1 | 6/2017 | Lu | |

(Continued)

OTHER PUBLICATIONS

U.S. Appl. No. 17/697,156, "Non-Final Office Action", U.S. Appl. No. 17/697,156, filed Apr. 27, 2023, 14 pages.

(Continued)

*Primary Examiner* — Timothy J Henn
(74) *Attorney, Agent, or Firm* — FIG. 1 Patents

(57) ABSTRACT

Techniques for visual feature based video effects are described and are implementable to determine one or more visual features associated with an individual and generate a modified video feed based on the visual features. The described implementations enable automatic focus of a video feed to a particular focal region based on facial features of the individual. For instance, a visual feature such as pupillary distance or pupil size is determined from a video feed. A focal distance is calculated based on the visual feature, e.g., indicating a region that the individual is focused on. A modified video stream is then generated based on the focal distance, for instance to focus the video stream to a specific focal plane.

20 Claims, 8 Drawing Sheets

(56) References Cited

U.S. PATENT DOCUMENTS

| | | |
|---|---|---|
| 2017/0364148 A1 | 12/2017 | Kim |
| 2019/0065845 A1* | 2/2019 | Xu .................... G06F 21/602 |
| 2019/0076014 A1* | 3/2019 | Ryan ................... G06V 40/19 |
| 2019/0260981 A1* | 8/2019 | Ollila .................. H04N 13/243 |
| 2020/0357184 A1 | 11/2020 | Paul et al. |
| 2021/0096611 A1 | 4/2021 | Schenone et al. |
| 2021/0104063 A1 | 4/2021 | Kassis et al. |
| 2021/0133440 A1* | 5/2021 | Silverstein ............. G06F 3/013 |
| 2021/0158049 A1 | 5/2021 | Leppänen et al. |
| 2021/0258472 A1* | 8/2021 | Hamano .............. H04N 23/667 |
| 2021/0357637 A1* | 11/2021 | Fu ....................... G06V 10/147 |
| 2022/0311952 A1 | 9/2022 | Vanka et al. |
| 2023/0113499 A1* | 4/2023 | Lee ..................... H04N 23/675 348/78 |
| 2023/0213729 A1 | 7/2023 | Huang et al. |
| 2023/0276115 A1 | 8/2023 | Agrawal et al. |
| 2023/0276116 A1 | 8/2023 | Agrawal et al. |
| 2023/0298197 A1 | 9/2023 | Agrawal et al. |
| 2023/0418371 A1* | 12/2023 | Lutter ................. G06F 3/04847 |
| 2024/0114229 A1 | 4/2024 | Agrawal et al. |

OTHER PUBLICATIONS

U.S. Appl. No. 17/682,278, "U.S. Application as Filed", U.S. Appl. No. 17/682,278, filed Feb. 28, 2022, 69 pages.

U.S. Appl. No. 17/682,388, "U.S. Application as Filed", U.S. Appl. No. 17/682,388, filed Feb. 28, 2022, 70 pages.

U.S. Appl. No. 17/697,156, "U.S. Application as Filed", U.S. Appl. No. 17/697,156, filed Mar. 17, 2022, 50 pages.

Motorola, "Motorola Ready For", Motorola Mobility LLC. [retrieved Aug. 8, 2022]. Retrieved from the Internet <https://www.motorola.in/ready-for/p>., 13 Pages.

U.S. Appl. No. 17/682,388, "Notice of Allowance", U.S. Appl. No. 17/682,388, filed Oct. 4, 2023, 17 pages.

Desai, Rahul Bharat, et al., "Pursuant to MPEP § 2001.06(b) the applicant brings the following co-pending application to the Examiner's attention:", U.S. Appl. No. 18/363,929, filed Aug. 2, 2023, 59 pages.

U.S. Appl. No. 17/697,156, "Non-Final Office Action", U.S. Appl. No. 17/697,156, filed Dec. 8, 2023, 18 pages.

U.S. Appl. No. 17/697,156, "Final Office Action", U.S. Appl. No. 17/697,156, filed Mar. 21, 2024, 6 pages.

\* cited by examiner

VISUAL FEATURE BASED VIDEO EFFECTS

BACKGROUND

Today's modern devices provide users with a variety of different opportunities for capturing multimedia content. For instance, a typical smart device (e.g., a smartphone) includes image capture capability for capturing still images and video, as well as audio capture capability. Many modern smartphone cameras are capable of capturing content with similar quality to professional cameras and accordingly smartphone videography is more accessible than ever. However, current ways for enabling videographic effects are limited and can be labor intensive, which can reduce efficiency and offset the benefits associated with smartphone videography.

BRIEF DESCRIPTION OF THE DRAWINGS

Aspects of visual feature based video effects are described with reference to the following Figures. The same numbers may be used throughout to reference similar features and components that are shown in the Figures.

DETAILED DESCRIPTION

Figure 1:
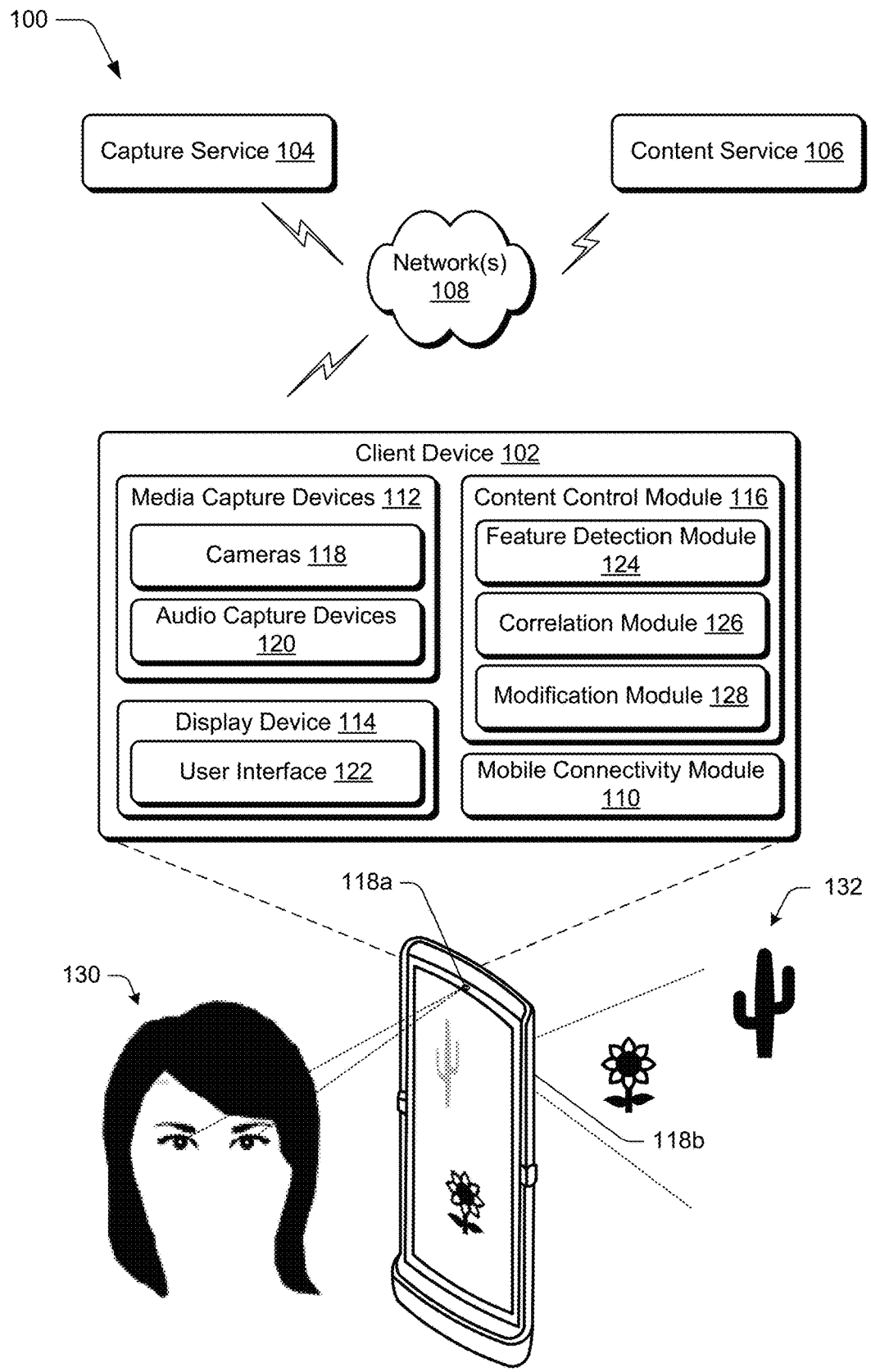
FIG. 1 illustrates an example environment in which aspects of visual feature based video effects can be implemented.

Techniques for visual feature based video effects are described and are implementable to enable determination of one or more visual features associated with an individual and generation of a modified video feed based on the one or more visual features. The described implementations, for instance, enable a video feed to be automatically focused to a particular focal distance based on facial features of an individual.

According to various implementations, a client device e.g., a smartphone, is operable to receive a first video feed including a representation of an individual, such as a user of the client device. In various examples, the first video feed includes a representation of a facial region of the user. The client device is also operable to receive a second video feed that depicts a scene. In some implementations, the client device includes multiple cameras for capturing video content from various perspectives of the client device. For instance, the client device includes a first camera that captures an image of an individual, e.g., a front facing camera, and a second camera that captures a visual scene, e.g., a rear facing camera. Thus, the first camera is operable to generate the first video feed and the second camera is operable to generate the second video feed. In alternative or additional examples, the first video feed and/or second video feed are communicated to the client device, e.g., as captured by another device.

In an example, the client device is a multicamera mobile device and includes a content control module configured to process a first video feed and a second video feed, e.g., as captured by a first and second camera respectively. From the first video feed, the content control module is operable to detect one or more visual features associated with the individual, such as facial features that correlate to a focal distance of the user. The focal distance, for instance, represents a point, plane, region, and/or location in the scene that the individual is focused on. In various examples, the visual features include one or both of a pupillary distance and/or a pupil size.

By way of example, the content control module is configured to determine a pupillary distance of an individual depicted in the first video feed, e.g., a distance between a pupil of the individual's left eye and a pupil of the individual's right eye. The content control module does so, for example, using one or more pupil tracking and/or detection techniques. In this example, the pupillary distance of the individual is indicative of a focal distance. For example, a longer pupillary distance corresponds to a longer focal distance, e.g., indicating that an individual is focusing on a "far away" object. A shorter pupillary distance corresponds to a shorter focal distance, e.g., indicating that an individual is focusing on a "close-up" object.

In alternative or additional implementations, the content control module is configured to determine a pupil size of an individual depicted in the first video feed, e.g., the user of the mobile device. A variety of pupil size detection methods are contemplated, e.g., various software-based methodologies, convolutional neural network-based techniques, etc. In an example, the pupil size of the individual indicates a focal distance such as a point or region that the individual is focused on. For example, a relatively larger pupil size corresponds to a shorter focal distance, and a relatively smaller pupil size corresponds to a longer focal distance. While pupillary distance and pupil size are primarily discussed, a variety of visual features are considered including facial gestures, user gestures, blink frequency and/or predetermined sequences, etc.

Accordingly, based on one or more visual features associated with an individual, e.g., facial features such as pupillary distance and/or pupil size, the client device is operable to calculate a focal distance of the individual in relation to the scene. In some implementations, the content control module utilizes one visual feature to calculate focal distance. In other implementations, the content control module averages focal distances calculated based on different visual features, e.g., by applying a weighting to the respective focal distances. In some examples, the focal distance is calculated based on a correlation between a particular visual feature and focal distance. The correlation can be defined in a variety of ways, e.g., a linear relationship, non-linear relationship, customized algorithm, by one or more equations, etc. In some examples, the correlation is pre-defined, e.g., as a default correlation applicable to a wide range of individuals. In additional or alternative examples, the correlation varies from user to user, and thus the calculation of a focal distance is specific to a respective user.

Accordingly, in some implementations, calculation of a focal distance includes a calibration process, e.g., to generate a user-specific correlation between a particular visual feature and the focal distance. For instance, as part of the calibration the content control module is operable to determine one or more baseline values for a given visual feature for a user at one or more focal distances. For instance, in an example in which the visual feature includes pupillary distance, the client device determines a first baseline pupillary distance for the individual at a close focal distance. The client device is further operable to determine a second baseline pupillary distance for the individual at a far focal distance. Accordingly, the client device can generate a user-specific correlation between the pupillary distance and the focal distance based in part on the first baseline pupillary distance and/or the second baseline pupillary distance, e.g., using regression analysis, curve fitting techniques, etc. Thus, the user-specific correlation is usable to calculate the focal distance.

In various examples, more than two baseline values can be used to generate a robust user-specific correlation between the visual feature and the focal distance. In some implementations, user-specific correlations are stored in a user database, e.g., that the client device can access to calculate the focal distance. For instance, the client device can determine an identity of the user depicted by the first video feed, such as by recognizing a user login, using facial recognition modalities, voice recognition, etc. Based on the identity, the content control module is operable to access a corresponding user-specific correlation from the user database to calculate a focal distance. In alternative or additional embodiments, the calibration process is initiated responsive to receiving the second video feed, e.g., at the start of a video content recording session.

In some examples, calculation of the focal distance is based in part on detection of an environmental context and/or a user context. For instance, the client device is operable to select one or more visual features to calculate a focal distance based on the environmental context and/or the user context. The environmental context can include features of the scene surrounding the user of the client device, e.g., lighting conditions, shadows, temperature, time of day, location, objects, etc. The user context describes features or conditions of the user as further described below, e.g., facial features, eye conditions, health data such as blood pressure, diet, etc. By way of example, the client device detects a lighting condition of the environment surrounding the individual and determines that pupillary distance is a reliable metric to calculate the focal distance. In another example, the client device is operable to detect that the individual has an eye condition such as amblyopia, i.e., a "lazy eye," and thus pupillary distance is not a viable metric to calculate focal distance. Accordingly, in this example, pupil size is selected by the client device to calculate a focal distance.

In various examples, the client device is operable to validate the focal distance, e.g., as part of the calculation. For instance, the content control module is employed to compare focal distances calculated based on different visual features one to another. For instance, the content control module compares a focal distance calculated based on pupillary distance to a focal distance calculated based on pupil size. In one or more examples, the client device is operable to validate the focal distance using object recognition and/or gaze detection strategies. For instance, the client device uses object recognition to detect an object included in the second video feed and compares a distance to the object with the calculated focal distance. In this example, the presence of an object within a threshold region of the focal distance verifies the focal distance.

The client device is further operable to generate a modified video feed based on the focal distance by modifying a visual property of the second video feed. In various examples, the visual property includes one or more of a focus, zoom, or visual enhancement to a feature included in the scene. For instance, the content control module is operable to focus on a region of the second video feed based on the calculated focal distance. In another example, the content control module is operable to zoom in on an object located in a region defined by the focal distance. In additional or alternative examples, the client device can insert additional content to the second video feed at a focal distance, e.g., an animation, CGI feature, additional video content, etc. Thus, a wide range of videographic effects can be generated in real time responsive to user behaviors and natural actions.

Consider, for instance, that a user of the client device is recording a scene for a film class. As part of the scene, the user wishes to create a "rack focus" effect, in which the focus changes over the course of a shot from one focal plane to another, e.g., from an object in the background to an object in the foreground. In conventional scenarios, this requires precise filmography skills and/or tedious post-production techniques to simulate the effect. Thus, conventional techniques can be challenging, time-consuming, and require an in-depth knowledge of advanced filming and/or software abilities. Using the techniques described herein, however, the client device can focus on a particular focal plane that the user is focused on based on natural visual features such as pupillary distance of the user.

Accordingly, the techniques described herein enable intuitive and automatic control over videographic effects using visual features of an individual. These capabilities obviate the need for a user to manually specify a focal plane or have advanced technical filmography or post-production skills.

While features and concepts of visual feature based video effects can be implemented in any number of environments and/or configurations, aspects of visual feature based video effects are described in the context of the following example systems, devices, and methods.

FIG. 1 illustrates an example environment 100 in which aspects of visual feature based video effects can be implemented. The environment 100 includes a client device 102, a capture service 104, and a content service 106 that are interconnectable via network(s) 108. In this particular example, the client device 102 represents a multi-camera portable device that can be carried by a user, such as a smartphone or a tablet device. These examples are not to be construed as limiting, however, and the client device 102 can be implemented in a variety of different ways and form factors such as a digital camera, laptop computer, desktop computer, webcam, a docked mobile device connected to a monitor, and so forth. Example attributes of the client device 102 are discussed below with reference to the device 800 of FIG. 8.

The client device 102 includes various functionality that enables the client device 102 to perform different aspects of visual feature based video effects discussed herein, including a mobile connectivity module 110, media capture devices 112, a display device 114, and a content control module 116. The mobile connectivity module 110 represents functionality (e.g., logic and hardware) for enabling the client device 102 to interconnect with other devices and/or networks, such as the network 108. The mobile connectivity module 110, for instance, enables wireless and/or wired connectivity of the client device 102.

Further to the environment 100, the capture service 104 represents a network-based service that is accessible to the client device 102 (e.g., via the network 108) for assisting in content capture and/or control tasks. For example, the content control module 116 leverages the capture service 104 to assist in performing visual feature recognition tasks, such as for detecting different visual features. In at least one implementation the capture service 104 provides AI services to the content control module 116 for enabling different visual feature recognition tasks. The content service 106 represents a network-based service to which instances of video content are publishable such as to enable other users to access and consume instances of the video content.

The media capture devices 112 are representative of functionality to enable various types of media to be captured via the client device 102, such as visual media and audio media. In this particular example the media capture devices 112 include video capture devices such as cameras 118 and audio capture devices 120. In one or more examples, the cameras 118 include a first camera 118a, e.g., a front camera, and a second camera 118b, e.g., a rear camera. The media capture devices 112, however, can include a variety of other devices that are able to capture various types of media in accordance with the implementations discussed herein. The media capture devices 112, for instance, include not only hardware for capturing associated media but also logic (e.g., drivers, firmware, etc.) for operating and configuring operation of the associated media capture devices 112. The display device 114 represents functionality (e.g., hardware and logic) for enabling visual output via the client device 102. For instance, via a user interface 122.

The content control module 116 represents functionality for performing various aspects of visual feature based video effects described herein and is illustrated as including a feature detection module 124, a correlation module 126, and a modification module 128. The content control module 116 is operable to receive a first video feed including a representation of an individual and a second video feed that depicts a scene. As described herein, a video feed can include one or more video frames, e.g., a single frame such as a digital image and/or multiple frames such as a digital video. In various examples, the feature detection module 124 is employed to detect one or more visual features of the individual, e.g., facial features such as pupillary distance and/or pupil size. Based on the one or more visual features, the correlation module 126 is operable to calculate a focal distance, e.g., a distance to a focal plane that the individual is focusing on. The modification module 128 is operable to generate a modified video feed based on the focal distance, for instance by modifying a visual property of the second video feed.

Example operations of visual feature based video effects are illustrated in FIG. 1. In the example, the client device 102 is depicted as a multicamera mobile device with the first camera 118a facing a user 130 and the second camera 118b facing a scene 132. The scene 132 includes a flower proximal to the client device 102, and a cactus distal to the client device 102. That is, the flower is closer to the user 130 and the client device 102 than the cactus is. The content control module 116 is operable to receive a first video feed including a representation of a facial region of the user 130 and a second video feed depicting the scene 132, e.g., the flower and cactus.

Continuing with the above example, the feature detection module 124 is employed to detect one or more facial features of the user 130. In the illustrated example, the feature detection module 124 determines a pupillary distance associated with the user. Based on the pupillary distance, the correlation module 126 calculates a focal distance of the user 130. In this example, the focal distance indicates that the user 130 is focused on the flower and not the cactus. Accordingly, the modification module 128 is operable to modify a visual feature of the second video feed based on the focal distance. For instance, as depicted by the display device 114 the modified video feed focuses on the flower, and the cactus is depicted as out of focus. Accordingly, the techniques described herein enable the user 130 to modify the second video feed by simply looking at the flower.

Having discussed an example environment in which the disclosed techniques can be performed, consider now some example scenarios and implementation details for implementing the disclosed techniques.

Figure 2:
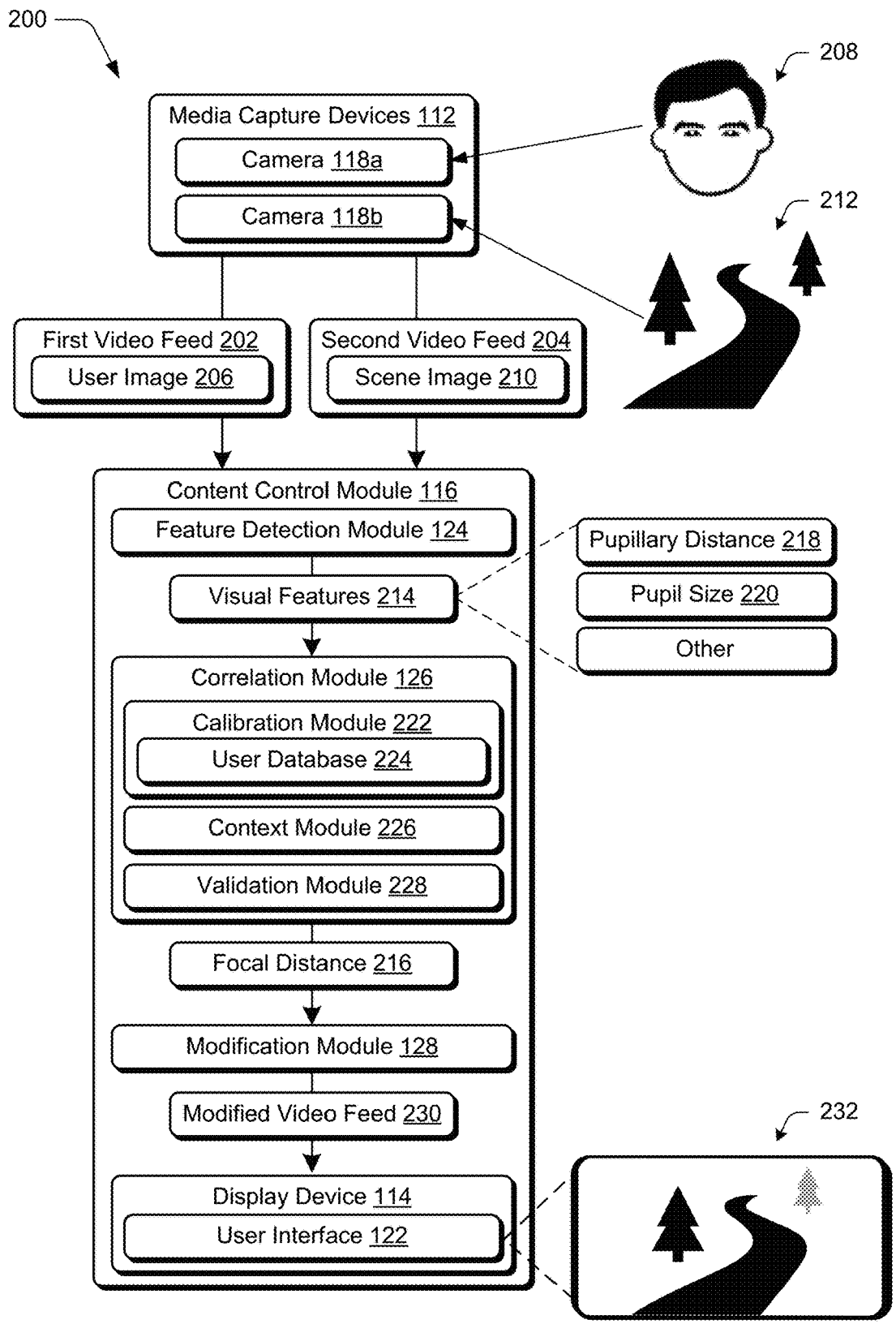
FIG. 2 depicts an example system for visual feature based video effects in accordance with one or more implementations.

FIG. 2 depicts an example system 200 for visual feature based video effects in accordance with one or more implementations. The system 200 can be implemented in the environment 100 and incorporates attributes of the environment 100 introduced above. In the example system 200, the content control module 116 receives a first video feed 202 and a second video feed 204. In some implementations, the first video feed 202 and/or second video feed 204 are communicated to the client device 102, e.g., as captured by another device. In the illustrated example, however, the first video feed 202 and second video feed 204 are obtained by media capture devices 112, for instance a first camera 118a (e.g., a front facing camera) and a second camera 118b, e.g., a rear facing camera. In the example, the first video feed 202 includes a user image 206, e.g., including a representation of a facial region of an individual at 208. The second video feed 204 includes a scene image 210, for instance depicting the scene 212.

The feature detection module 124 is operable to detect one or more visual features 214 associated with the user image 206, such as a pupillary distance 218 and/or a pupil size 220. While pupillary distance 218 and pupil size 220 are primarily discussed as visual features 214 in the following examples, visual features 214 can represent any suitable feature associated with an individual that correlates to a focal distance 216. The focal distance 216 represents a point, plane, region, and/or location in a scene that an individual is focused on. In one or more examples, visual features 214 may include facial gestures of an individual, user gestures such as hand movements, blink frequency and/or predetermined sequences, etc. In some examples, predefined gestures and/or actions correspond to varying focal distances 216, e.g., a sequence of three quick blinks can indicate a short focal distance 216 while a sequence of four quick blinks can indicate a larger focal distance 216. In other implementations, the visual features 214 pertain to qualities of a camera, for instance the size of an aperture of a camera lens. For instance, a small aperture indicates a far focal distance 216 while a large aperture indicates a short focal distance 216.

In an example, the feature detection module 124 is configured to determine a pupillary distance 218 of the user, e.g., as represented by the user image 206. The feature detection module 124 is operable to employ any suitable modality to do so, e.g., by using one or more software based pupil tracking and/or detection techniques. In an example, a longer pupillary distance 218 corresponds to a longer focal distance 216, e.g., indicating that an individual is focusing on a "far away" object. A shorter pupillary distance 218 corresponds to a shorter focal distance 216, e.g., indicating that an individual is focusing on a "close-up" object. In various examples, the feature detection module 124 determines an average pupillary distance 218 for the individual, e.g., over a specified time interval.

In alternative or additional implementations, the feature detection module 124 is configured to determine a pupil size 220 of the individual depicted by the user image 206. Pupil size for instance, can be measured as a diameter, coverage area, circumference, etc. The feature detection module 124 is operable to employ any suitable pupil size determination modality to do so, e.g., various software-based methodologies or techniques. In an example, the pupil size 220 indicates a point or region that the individual is focused on. For example, a relatively larger pupil size 220 corresponds to a shorter focal distance 216, and a relatively smaller pupil size 220 corresponds to a longer focal distance 216. In various examples, the feature detection module 124 determines a pupil size 220 of both eyes of an individual and determines an average pupil size 220 for the individual. In additional or alternative examples, the feature detection module 124 determines an average pupil size 220 for the individual over a specified time interval.

Accordingly, based on one or more visual features 214 associated with an individual, e.g., facial features such as pupillary distance 218 and/or pupil size 220, the correlation module 126 is operable to calculate a focal distance 216 of the individual at 208 in relation to the scene 212. In some examples, the focal distance 216 is calculated based on a correlation between a particular visual feature 214 and focal distance 216. The correlation can be defined in a variety of ways, e.g., by a linear relationship, a non-linear relationship, customized algorithm, using machine learning modalities, by one or more equations, etc. In some examples, the correlation is pre-defined, e.g., as a default correlation applicable to a wide range of individuals. In additional or alternative examples, the correlation varies from user to user, and thus the calculation of a focal distance 216 is specific to a given user.

In one or more examples, the correlation module 126 includes a calibration module 222. The calibration module 222 is configured to implement a calibration process, e.g., to generate a user-specific correlation between a particular visual feature 214 and the focal distance 216. For instance, the calibration module 222 is employed to determine one or more baseline values for a given visual feature 214 for a user at one or more focal distances 216. For instance, in an example in which the visual feature 214 includes pupillary distance 218, the correlation module 126 determines a first baseline pupillary distance 218 for the individual at a close focal distance 216. The calibration module 222 also determines a second baseline pupillary distance 218 for the individual at a far focal distance 216. Accordingly, the correlation module 126 can generate a user-specific correlation between the pupillary distance 218 and the focal distance 216 based in part on the first baseline pupillary distance 218 and the second baseline pupillary distance 218, e.g., using regression analysis, curve fitting techniques, etc. Thus, the user-specific correlation is usable to calculate the focal distance 216.

In various examples, the calibration module 222 determines more than two baseline values to build a robust user-specific correlation between the visual feature 214 and the focal distance 216. In some implementations, user-specific correlations are stored in a user database 224, e.g., that the correlation module 126 can access to calculate the focal distance 216. In some embodiments, the correlation module 126 is operable to determine an identity of the user depicted by the user image 206, for instance via a user login, using facial recognition modalities, voice recognition, etc. Based on the identity, the correlation module 126 is operable to access a corresponding user-specific correlation from the user database 224 to calculate a focal distance 216. In alternative or additional embodiments, the calibration process is initiated responsive to receiving the second video feed 204 and/or the first video feed 202, e.g., at the start of a video content recording session.

The correlation module 126 also includes a context module 226 that is operable to detect a context such as an environmental context and/or a user context, e.g., via one or more sensors. The correlation module 126 is operable to factor in the detected context to calculate the focal distance 216 as discussed in more detail below with respect to FIG. 5. In one or more examples, the context module 226 identifies one or more visual features 214 to use to calculate a focal distance 216 based on the detected context. The environmental context can include features of the ambient setting surrounding the client device 102, e.g., lighting conditions, shadows, temperature, time of day, location, objects, etc. The user context may include features or conditions associated with the user, e.g., facial features, eye conditions, health data such as blood pressure, recent diet, etc.

For instance, the context module 226 is operable to detect a user condition that an individual has that makes it impractical to use pupillary distance 218 to calculate a focal distance, such as amblyopia (lazy eye), strabismus (crossed eyes), only having one eye, one eye is obscured, etc. In some examples, the context module 226 is configured to access health data associated with the individual, e.g., from a health application of the client device. For instance, the context module 226 can determine that the individual has recently consumed alcohol and/or caffeine, which has a notable impact on one or more visual features 214, e.g., pupil size 220. Thus, the correlation module 126 is operable to factor in the user context when calculating the focal distance 216, and/or select a visual feature 214 based on the user context.

In another example, the context module 226 detects an environmental context such as a lighting condition and determines that pupillary distance 218 is a reliable metric to calculate the focal distance 216. Continuing with this example, the correlation module 126 is operable to take into account the lighting condition when calculating a focal distance 216. For instance, a pupillary distance 218 in a bright environment may correspond differently to the focal distance 216 than in a dim environment. Thus, the correlation module 126 considers the environmental conditions, e.g., by adjusting an algorithm used to calculate the focal distance 216.

The correlation module 126 also includes a validation module 228 that is operable to validate the focal distance 216, e.g., as part of the calculation. For instance, the validation module 228 is employed to compare focal distances 216 calculated based on different visual features 214, one to another. For instance, the validation module 228 compares a focal distance 216 calculated based on pupillary distance 218 to a focal distance 216 calculated based on pupil size 220. In some examples, responsive to the verification, the correlation module 126 utilizes one visual feature 214 to calculate focal distance 216, e.g., a verified visual feature 214. In other implementations, the correlation module 126 utilizes more than one visual feature 214 to calculate the focal distance 216, e.g., by averaging focal distances 216 calculated based on different visual features 214. In some examples, calculation of the focal distance 216 includes applying a weighting to focal distances 216 calculated based on different visual features 214.

In alternative or additional examples, the validation module 228 is operable to validate the focal distance 216 using object recognition and/or gaze detection strategies. For instance, the validation module 228 leverages one or more suitable object recognition techniques to detect an object included in the second video feed 204. Additionally or alternatively, the validation module 228 leverages one or more gaze detection modalities, e.g., by utilizing the first camera 118a to determine a direction of the individual's gaze. The validation module 228 is operable to determine a distance to the object and compare it to the calculated focal distance 216. Thus, in this example, the presence of an object within a threshold region of the focal distance 216 verifies the accuracy of the calculated focal distance 216.

The modification module 128 is operable to generate a modified video feed 230 based on the focal distance 216, e.g., by modifying a visual property of the second video feed 204. In various examples, the visual property includes one or more of a focus, zoom, or visual enhancement to a feature included in a scene. For instance, the modification module 128 is operable to focus on a region of the second video feed 204 based on the calculated focal distance 216. In another example, the modification module 128 is operable to apply a zoom to an object included in the scene 212 located in a region definable by the focal distance 216. In additional or alternative examples, the modification module 128 can insert additional content to the second video feed 204 at the calculated focal distance 216, e.g., an animation or CGI feature. Thus, a wide range of visual effects can be generated in real time responsive to user behaviors and actions.

As depicted in FIG. 2, for instance, the feature detection module 124 determines a pupillary distance 218 of the individual at 208, and the correlation module 126 calculates a focal distance of the individual at 208 relative to the scene 212 based on the pupillary distance 218. In this example, the focal distance 216 indicates that the individual at 208 is focused on the front tree represented in the scene 212 and not the back tree. Accordingly, the modification module 128 is operable to modify a visual feature 214 of the second video feed 204 based on the focal distance 216. For instance, as shown at 232, the display device 114 depicts the modified video feed 230 via a user interface 122. As illustrated, the modified video feed 230 depicts the front tree of the scene 212 in focus, while the further away tree is out of focus. Accordingly, the techniques described enable intuitive and automatic control over videographic effects.

Figure 3:
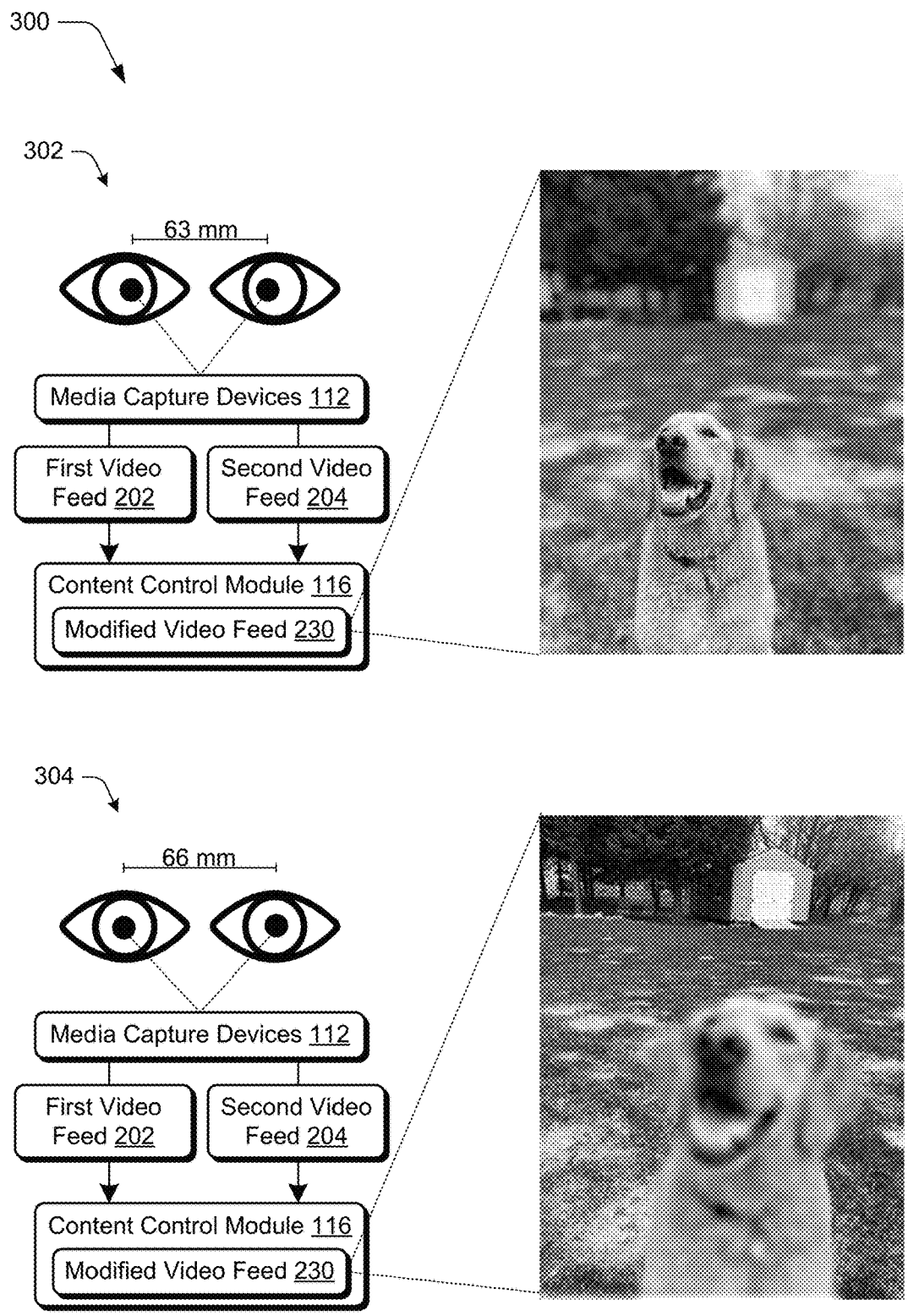
FIG. 3 depicts an example implementation for visual feature based video effects using pupillary distance to determine a focal distance in accordance with one or more implementations.

FIG. 3 depicts an example implementation 300 for visual feature based video effects using pupillary distance to determine a focal distance in accordance with one or more implementations. In this example, shown in first stage 302 and second stage 304, media capture devices 112 of a client device 102 are operable to capture a first video feed 202 and a second video feed 204. In this example, the first video feed 202 includes a representation of a facial region of an individual, depicted as a pair of eyes. The second video feed 204 depicts a scene including a dog in the foreground and a shed in the background. The content control module 116 receives the first video feed 202 and the second video feed 204, and in accordance with the techniques described above generates a modified video feed 230, in this example based on a pupillary distance 218.

As shown in first stage 302, for instance, the pupillary distance 218 is determined to be 63 mm, e.g., by a feature detection module 124 as described above. A correlation module 126 is operable to calculate a focal distance 216 based on the pupillary distance 218, which in this example corresponds to a focal distance 216 that indicates that the individual is focused on the dog. Accordingly, the content control module 116 is operable to modify a visual property of the second video feed 204, in this example changing a focus setting. Thus, the modified video feed 230 depicts the dog in focus, while the background and shed are out of focus. Progressing to second stage 304, the pupillary distance is determined to be 66 mm, which in this example corresponds to a focal distance 216 that indicates that the individual is focused on the shed. Accordingly, the content control module 116 changes the focus to be on the shed, and the modified video feed 230 depicts the shed in focus, while the dog in the foreground is out of focus.

Figure 4:
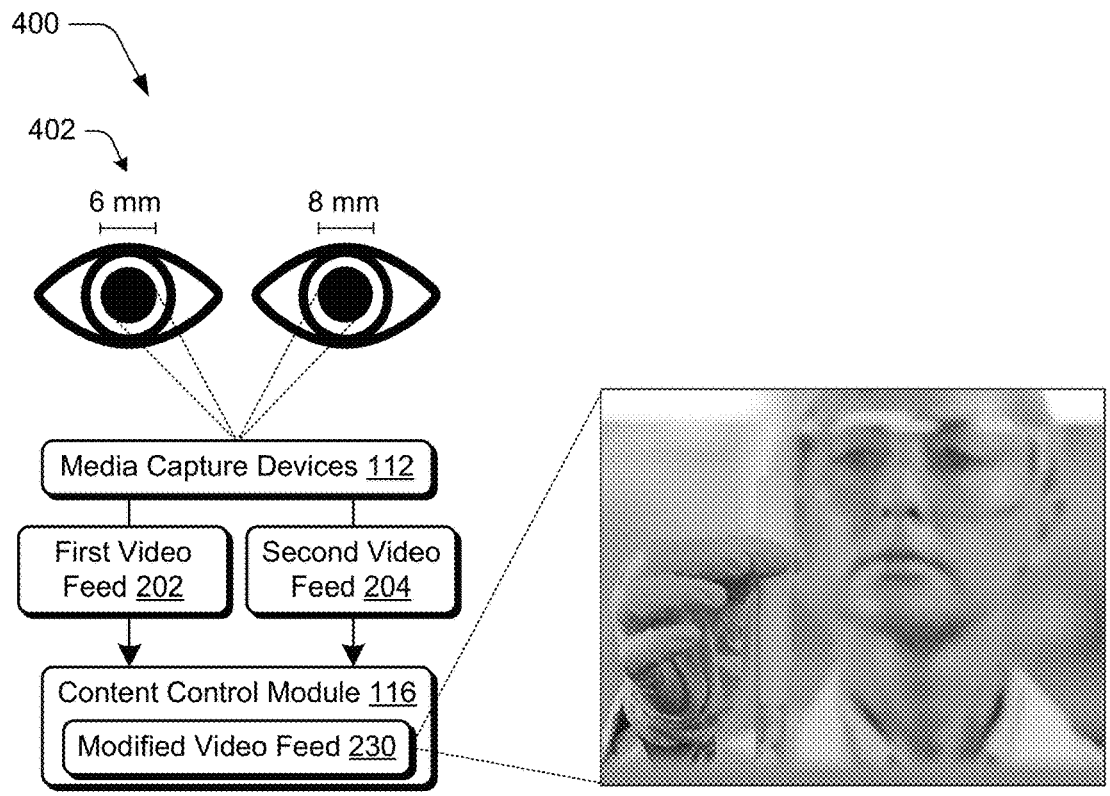
FIG. 4 depicts an example implementation for visual feature based video effects using pupil size to determine a focal distance in accordance with one or more implementations.
Figure 4:
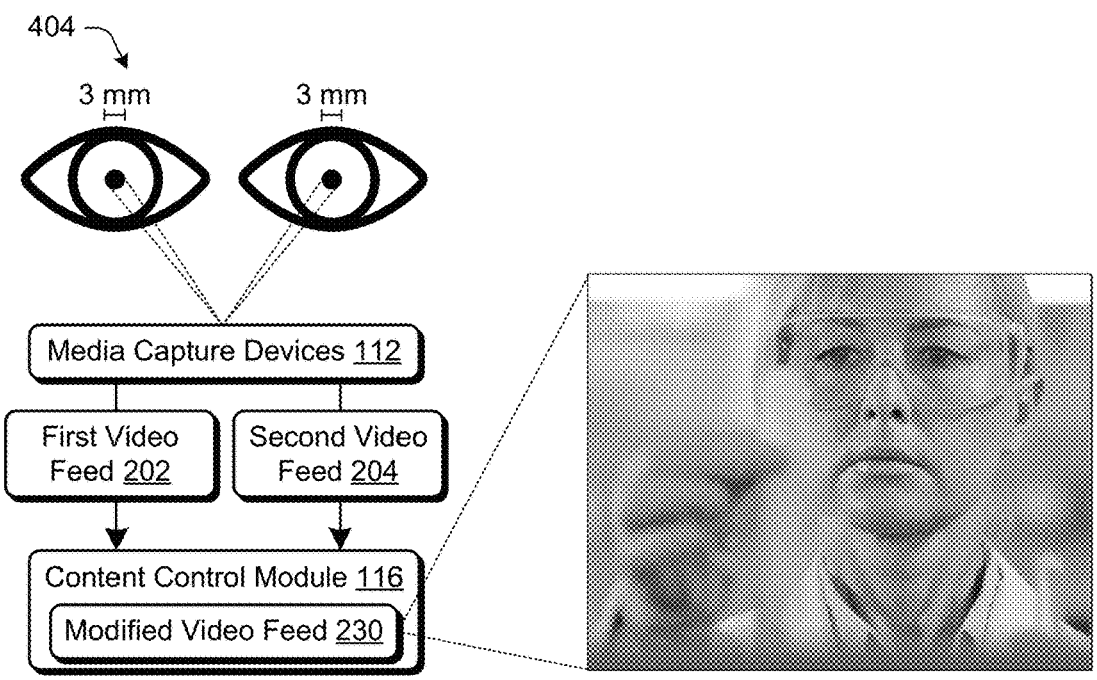

FIG. 4 depicts an example implementation 400 for visual feature based video effects using pupil size to determine a focal distance in accordance with one or more implementations. In this example, shown in first stage 402 and second stage 404, media capture devices 112 of a client device 102 are operable to capture a first video feed 202 and a second video feed 204. In this example, the first video feed 202 includes a representation of a facial region of an individual, illustrated as a pair of eyes. The second video feed 204 depicts a scene including a scientist holding a test tube. The content control module 116 receives the first video feed 202 and the second video feed 204, and in accordance with the techniques described above generates a modified video feed 230, in this example based on pupil size 220.

As shown in first stage 402, for instance, the pupil size 220 for the individual's right eye is determined to be 6 mm, and the pupil size 220 for the individual's left eye is determined to be 8 mm. Thus, the average pupil size for the individual is determined to be 7 mm. In this example, the pupil size 220 of 7 mm corresponds to a short focal distance 216 relative to the scene, which indicates that the individual is focused on the test tube in the foreground. Accordingly, the content control module 116 is operable to modify a visual property of the second video feed 204, in this example changing a focus setting. Thus, the modified video feed 230 depicts the test tube in focus, while the scientist in the background is out of focus.

Progressing to second stage 404, the pupil size 220 for the individual's right eye is determined to be 3 mm, and the pupil size 220 for the individual's left eye is also determined to be 3 mm. Thus, the average pupil size for the individual is determined to be 3 mm. In this example, the pupil size 220 of 3 mm corresponds to a long focal distance 216 relative to the scene, which indicates that the individual is focused on the scientist in the background. Accordingly, the content control module 116 is operable to change a focus setting and generate a modified video feed 230 in which the scientist is in focus while the test tube is out of focus.

Figure 5:
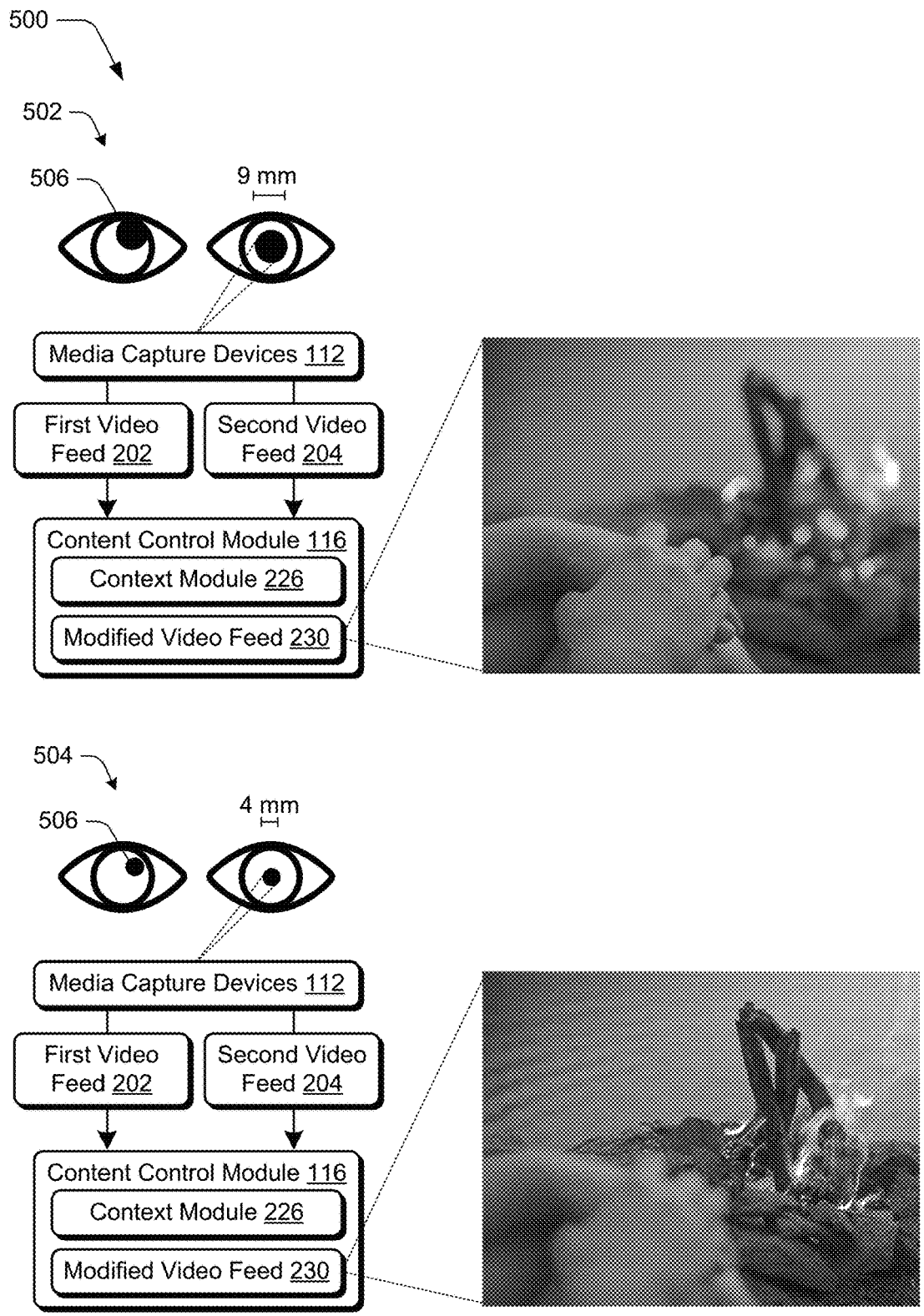
FIG. 5 depicts an example implementation for visual feature based video effects in which the focal distance is based on a detected context in accordance with one or more implementations.

FIG. 5 depicts an example implementation 500 for visual feature based video effects in which the focal distance is based on a detected context in accordance with one or more implementations. In this example, shown in first stage 502 and second stage 504, media capture devices 112 of a client device 102 are operable to capture a first video feed 202 and a second video feed 204. In this example, the first video feed 202 includes a representation of a facial region of an individual, illustrated as a pair of eyes. The second video feed 204 depicts a scene including a person sitting in front of a campfire next to a shoreline.

In this particular example, a context module 226 is employed to detect an environmental context and a user context. For instance, the context module 226 is operable to detect a user context that the individual included in the first video feed 202 has an eye condition such as strabismus, i.e., an eye misalignment, as shown in the individual's right eye at 506. For instance, the context module 226 is configured to determine the presence of an eye condition based on the position of the pupil relative to the iris and/or as compared to the pupil of the other eye. Accordingly, in this example using pupillary distance 218 to calculate the focal distance 216 is impractical. Thus, based on the detected user context, pupil size 220 of the unimpaired eye (e.g., the individual's left eye) is selected to calculate the focal distance 216.

Additionally, the context module 226 is configured to determine an environmental context. In the illustrated example, it is dusk and accordingly the ambient light levels are low. This has a natural effect on pupil size, e.g., to dilate them to allow more light into the eye, thus increasing pupil size. In various examples, a correlation between pupil size and focal distance is variable based on a number of extrinsic factors, e.g., light, diet, time, etc. Accordingly, the context module 226 is operable to detect extrinsic factors. In this example, the context module detects lighting conditions of the environment, e.g., using one or more of time data, light sensors, location information, etc. The correlation module 126 is thus operable to accommodate for the lower levels of ambient light when calculating the focal distance, e.g., by altering an equation and or algorithm used to calculate the focal distance.

As illustrated in first stage 502, the content control module 116 receives the first video feed 202 and the second video feed 204. In accordance with the techniques described above and further based on the detected context, the content control module 116 generates a modified video feed 230 based on pupil size 220. In this example the pupil size 220 is determined to be 9 mm, which when considering the lighting conditions corresponds to a short focal distance 216 relative to the scene. This indicates that the individual is focused on the person sitting in the foreground of the scene. Accordingly, the content control module 116 is operable to modify a visual property of the second video feed 204, in this example changing a focus setting. Thus, the modified video feed 230 depicts the person in focus, while the campfire and shoreline are out of focus.

Progressing to second stage 504, the pupil size 220 for the individual's right eye is determined to be 4 mm. In this example, the pupil size 220 of 4 mm corresponds to a long focal distance 216 relative to the scene when factoring in the lighting conditions. This serves as an indication that the that the individual is focused on a focal plane associated with the campfire. Accordingly, the content control module 116 is operable to change a focus setting and generate a modified video feed 230 in which the campfire and nearby shoreline are in focus, while the person is out of focus. Thus, the techniques described herein enable generation of dynamic visual effects for a wide range of users in a variety of environments and settings.

Figure 6:
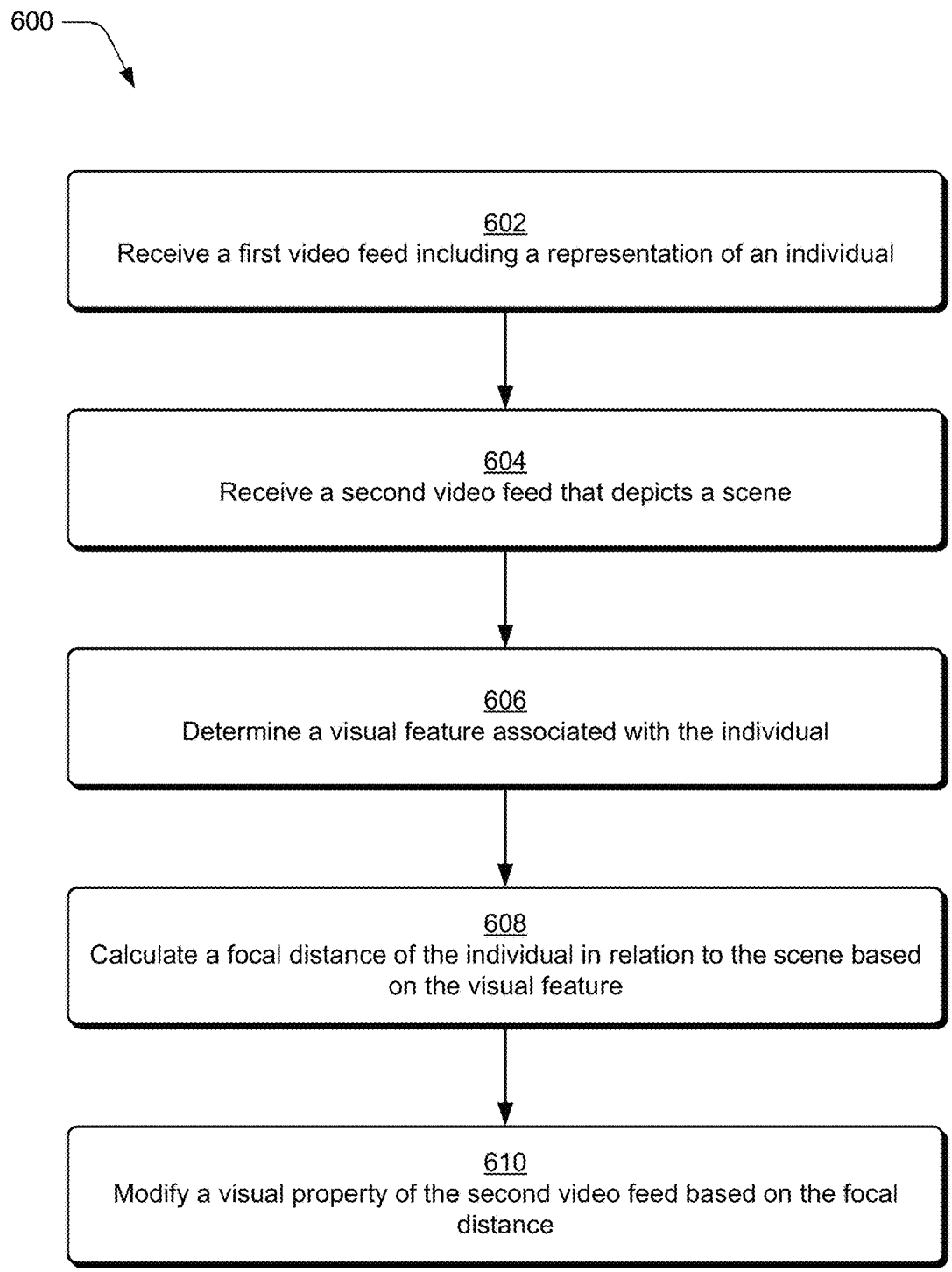
FIG. 6 illustrates a flow chart depicting an example method for visual feature based video effects in accordance with one or more implementations.

FIG. 6 illustrates a flow chart depicting an example method 600 for visual feature based video effects in accordance with one or more implementations. At 602, a first video feed is received including a representation of an individual. In various implementations, the first video feed 202 includes a representation of a facial region of an individual, such as a user of a client device 102. In one or more examples, the first video feed 202 is captured by a first camera of the client device 102, e.g., a front camera of a mobile device. In additional or alternative implementations, the first video feed 202 is communicated to the client device 102, e.g., as captured by another device. At 604, a second video feed is received that depicts a scene. In at least one implementation, the second video feed is obtained from a second camera of the client device 102, e.g., a rear camera of a mobile device. In additional or alternative implementations, the second video feed 202 is communicated to the client device 102, e.g., as captured by another device.

At 606, a visual feature associated with the individual is determined. In various examples, the visual features 214 include a pupillary distance 218 and/or a pupil size 220. Visual features 214 can also represent any suitable feature associated with an individual that correlates to a focal distance 216, e.g., facial gestures, user gestures, etc. With respect to pupillary distance 218, in an example a longer pupillary distance 218 corresponds to a longer focal distance 216, while a shorter pupillary distance 218 corresponds to a shorter focal distance 216. The feature detection module 124 is operable to employ any suitable modality to determine a pupillary distance 218, e.g., by using one or more software based pupil tracking and/or detection techniques.

Additionally or alternatively, the feature detection module 124 is configured to determine a pupil size 220 of the individual depicted by the user image 206. The feature detection module 124 is operable to employ any suitable pupil size determination modality to do so, e.g., various software-based methodologies or techniques. In an example a relatively larger pupil size 220 corresponds to a shorter focal distance 216, and a relatively smaller pupil size 220 corresponds to a longer focal distance 216. In various examples, the feature detection module 124 determines a pupil size 220 of both eyes of an individual and determines an average pupil size 220 for the individual.

At 608 a focal distance of the individual in relation to the scene is calculated based on the visual feature. For instance, the focal distance is based on one or both of a pupillary distance 218 and/or a pupil size 220. The correlation module 126 is operable to calculate the focal distance 216 based on a correlation between a particular visual feature 214 and focal distance 216. The correlation can be defined in a variety of ways, e.g., by a linear relationship, a non-linear relationship, customized algorithm, using machine learning modalities, by one or more equations, etc.

In one or more examples, calculation of the focal distance 216 includes a calibration process, as further discussed below with respect to FIG. 7. The correlation module 126 may include a user database 224 including user-specific correlations between various visual features 214 and focal distance 216. Accordingly, in some examples, calculation of the focal distance 216 is based in part on reference to the user database 224. In additional or alternative examples, the focal distance 216 is calculated based on a context, e.g., an environmental context and/or a user context as detected by the context module 226. In various embodiments a validation module 228 is operable to validate the focal distance 216, e.g., as part of the calculation. For instance, the validation module is configured to leverage object recognition and/or gaze detection strategies to identity objects included in the scene depicted by the second video feed 204.

At 610 a visual property of the second video feed is modified based on the focal distance. A modification module 128 is operable to generate a modified video feed 230 based on the focal distance 216, e.g., by modifying a visual property of the second video feed 204. The modified video feed 230 can include one or more video frames, e.g., a single frame such as a digital image and/or multiple frames such as a digital video. In various examples, the visual property includes one or more of a focus, zoom, or visual enhancement to a feature included in a scene. In additional or alternative examples, the modification module 128 can insert additional content to the second video feed 204 at the calculated focal distance 216, e.g., an animation and/or CGI feature. Thus, a wide range of visual effects can be generated in real time responsive to user behaviors and actions.

Figure 7:
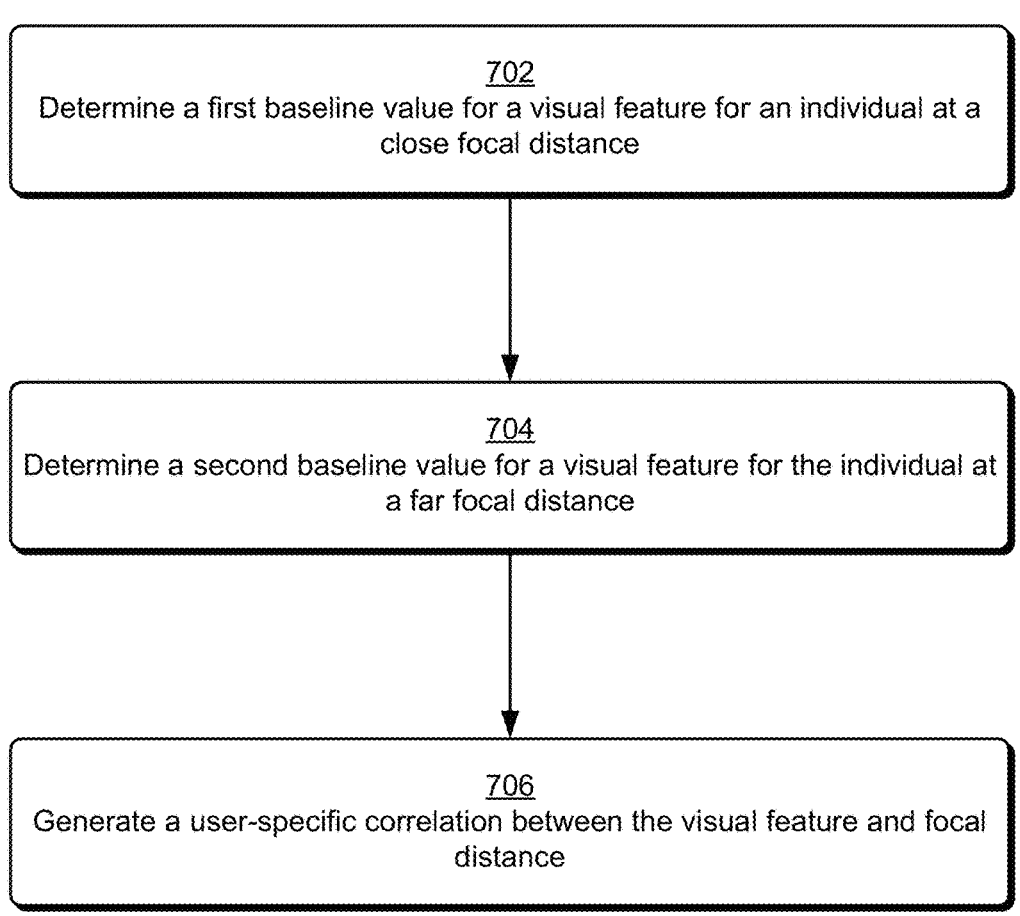
FIG. 7 illustrates a flow chart depicting an example method for visual feature based video effects describing a calibration process in accordance with one or more implementations.

FIG. 7 illustrates a flow chart depicting an example method 700 for visual feature based video effects describing a calibration process in accordance with one or more implementations. In an implementation, the example method 700 is performed as part of step 608 of FIG. 6. For instance, a calibration module 222 is configured to implement a calibration process, e.g., to generate a user-specific correlation between a particular visual feature 214 and the focal distance 216 as part of calculating the focal distance 216. At 702, a first baseline value for a visual feature is determined for an individual at a close focal distance. In an example in which the visual feature 214 includes pupillary distance 218, the correlation module 126 thus determines a first baseline pupillary distance 218 for the individual that corresponds to a close focal distance 216.

At 704, a second baseline value for a visual feature for the individual is determined at a far focal distance. For instance, continuing the example above in which the visual feature 214 includes pupillary distance 218, the correlation module 126 determines a second baseline pupillary distance 218 for the individual that corresponds to a far focal distance 216. This is by way of example, and a similar calibration process is implementable for additional visual features 214, e.g., pupil size 220.

At 706, a user-specific correlation between the visual feature and focal distance is generated. For instance, the user-specific correlation is based in part on the first baseline value and the second baseline value. In the example above, this includes generating a user-specific correlation between the pupillary distance 218 and the focal distance 216 based in part on the first baseline pupillary distance 218 and the second baseline pupillary distance 218. The calibration module 222 is configured to do so using a variety of techniques such as using regression analysis, curve fitting techniques, etc. Thus, the user-specific correlation is usable to calculate the focal distance 216 for a given user. This facilitates a customizable experience with precise calculation of a focal distance 216.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 8:
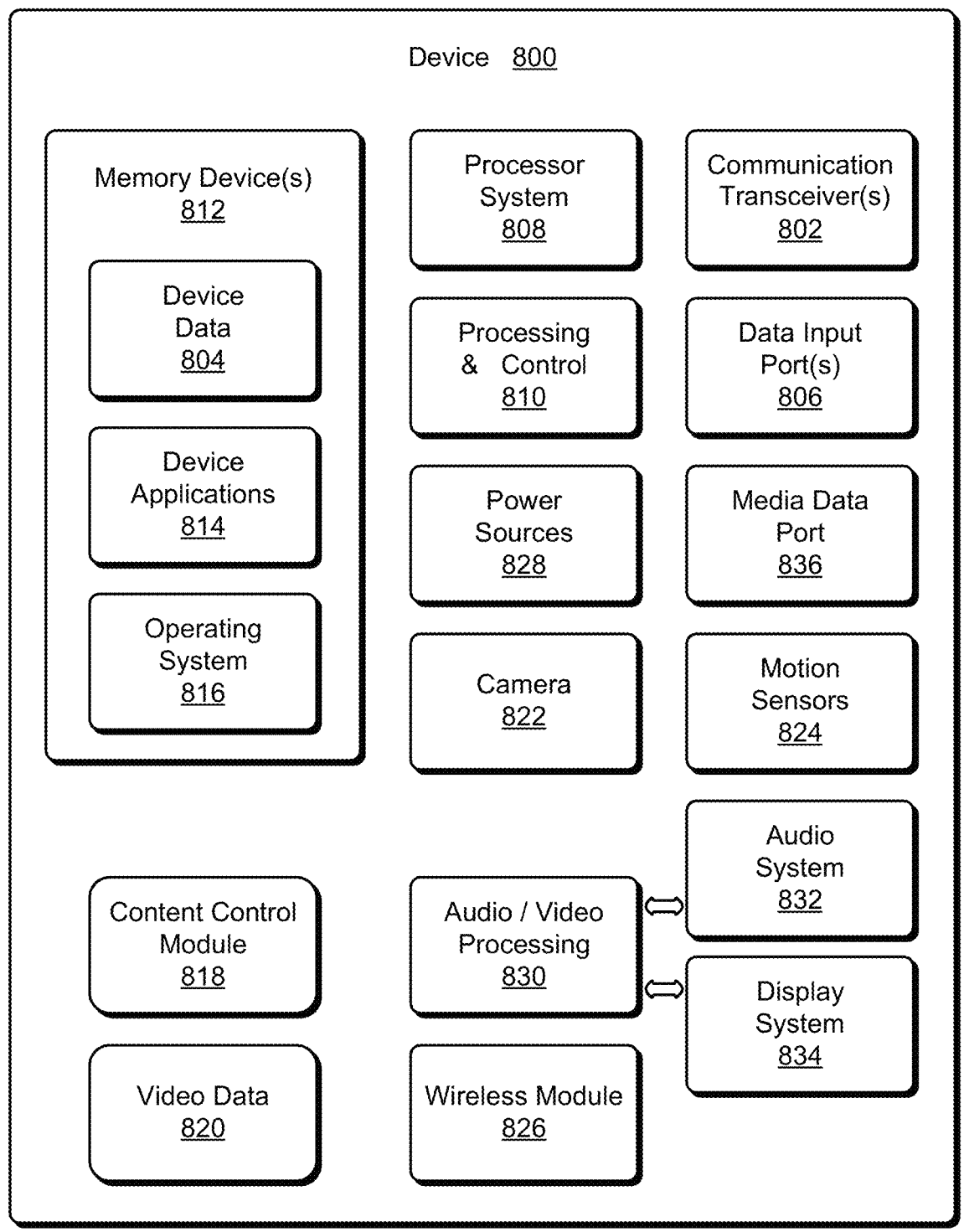
FIG. 8 illustrates various components of an example device in which aspects of visual feature based video effects can be implemented.

FIG. 8 illustrates various components of an example device 800 in which aspects of visual feature based video effects can be implemented. The example device 800 can be implemented as any of the devices described with reference to the previous FIGS. 1-7, such as any type of mobile device, mobile phone, mobile device, wearable device, tablet, computing, communication, entertainment, gaming, media playback, and/or other type of electronic device. For example, the client device 102 as shown and described with reference to FIGS. 1-7 may be implemented as the example device 800.

The device 800 includes communication transceivers 802 that enable wired and/or wireless communication of device data 804 with other devices. The device data 804 can include any of device identifying data, device location data, wireless connectivity data, and wireless protocol data. Additionally, the device data 804 can include any type of audio, video, and/or image data. Example communication transceivers 802 include wireless personal area network (WPAN) radios compliant with various IEEE 802.15 (Bluetooth™) standards, wireless local area network (WLAN) radios compliant with any of the various IEEE 802.11 (Wi-Fi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 800 may also include one or more data input ports 806 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 800 includes a processing system 808 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 810. The device 800 may further include any type of a system bus or other data and command transfer system that couples the various components within the device. A system bus can include any one or combination of different bus structures and architectures, as well as control and data lines.

The device 800 also includes computer-readable storage memory 812 (e.g., memory devices) that enable data storage, such as data storage devices that can be accessed by a computing device, and that provide persistent storage of data and executable instructions (e.g., software applications, programs, functions, and the like). Examples of the computer-readable storage memory 812 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 800 may also include a mass storage media device.

The computer-readable storage memory 812 provides data storage mechanisms to store the device data 804, other types of information and/or data, and various device applications 814 (e.g., software applications). For example, an operating system 816 can be maintained as software instructions with a memory device and executed by the processing system 808. The device applications may also include a device manager, such as any form of a control application, software application, signal-processing and control module, code that is native to a particular device, a hardware abstraction layer for a particular device, and so on. Computer-readable storage memory 812 represents media and/or devices that enable persistent and/or non-transitory storage of information in contrast to mere signal transmission, carrier waves, or signals per se. Computer-readable storage memory 812 do not include signals per se or transitory signals.

In this example, the device 800 includes a content control module 818 that implements aspects of visual feature based video effects and may be implemented with hardware components and/or in software as one of the device applications 814. In an example, the content control module 818 can be implemented as the content control module 116 described in detail above. In implementations, the content control module 818 may include independent processing, memory, and logic components as a computing and/or electronic device integrated with the device 800. The device 800 also includes video data 820 for implementing aspects of visual feature based video effects and may include data from and/or utilized by the content control module 818.

In this example, the example device 800 also includes a camera 822 and motion sensors 824, such as may be implemented in an inertial measurement unit (IMU). The motion sensors 824 can be implemented with various sensors, such as a gyroscope, an accelerometer, and/or other types of motion sensors to sense motion of the device. The various motion sensors 824 may also be implemented as components of an inertial measurement unit in the device.

The device 800 also includes a wireless module 826, which is representative of functionality to perform various wireless communication tasks. For instance, for the client device 102, the wireless module 826 can be leveraged to scan for and detect wireless networks, as well as negotiate wireless connectivity to wireless networks for the client device 102. The device 800 can also include one or more power sources 828, such as when the device is implemented as a mobile device. The power sources 828 may include a charging and/or power system, and can be implemented as a flexible strip battery, a rechargeable battery, a charged super-capacitor, and/or any other type of active or passive power source.

The device 800 also includes an audio and/or video processing system 830 that generates audio data for an audio system 832 and/or generates display data for a display system 834. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 836. In implementations, the audio system and/or the display system are integrated components of the example device. Alternatively, the audio system and/or the display system are external, peripheral components to the example device.

Although implementations of visual feature based video effects have been described in language specific to features and/or methods, the subject of the appended claims is not necessarily limited to the specific features or methods described. Rather, the features and methods are disclosed as example implementations of visual feature based video effects, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In some aspects, the techniques described herein relate to a computing device, including: a video capture device; and a content control module implemented at least partially in hardware to: receive a first video feed including a representation of a facial region of an individual via the video capture device; receive a second video feed that depicts a scene; determine a pupillary distance associated with the facial region of the individual; calculate a focal distance of the individual in relation to the scene based on the pupillary distance; and modify a visual property of the second video feed based on the focal distance.

In some aspects, the techniques described herein relate to a computing device, wherein the video capture device is a front camera of the computing device, and the second video feed is received from a rear camera of the computing device.

In some aspects, the techniques described herein relate to a computing device, wherein a longer pupillary distance corresponds to a longer focal distance and a shorter pupillary distance corresponds to a shorter focal distance.

In some aspects, the techniques described herein relate to a computing device, wherein the content control module is further configured to: determine a first baseline pupillary distance for the individual at a close focal distance; determine a second baseline pupillary distance for the individual at a far focal distance; and generate a user-specific correlation between the pupillary distance and the focal distance based in part on the first baseline pupillary distance and the second baseline pupillary distance, the user-specific correlation usable to calculate the focal distance.

In some aspects, the techniques described herein relate to a computing device, wherein to calculate the focal distance of the individual is based in part on reference to a user database, the user database including a user-specific correlation between one or more visual features associated with the individual and focal distance.

In some aspects, the techniques described herein relate to a computing device, wherein the content control module is further configured to determine a pupil size associated with the facial region of the individual, and wherein the focal distance is based in part on the pupil size.

In some aspects, the techniques described herein relate to a computing device, wherein the visual property is one or more of a focus, zoom, or visual enhancement to a feature included in the scene.

In some aspects, the techniques described herein relate to a computing device, wherein to calculate the focal distance is based in part on a detected environmental context describing one or more features of an ambient setting surrounding the computing device.

In some aspects, the techniques described herein relate to a method, including: receiving a first video feed including a representation of a facial region of an individual and a second video feed that depicts a scene; determining a pupillary distance associated with the facial region of the individual; calculating a focal distance of the individual based on the pupillary distance; and modifying a visual property of the second video feed based on the focal distance.

In some aspects, the techniques described herein relate to a method, wherein a longer pupillary distance corresponds to a longer focal distance and a shorter pupillary distance corresponds to a shorter focal distance.

In some aspects, the techniques described herein relate to a method, further including determining a pupil size associated with the facial region of the individual, and wherein the focal distance is based in part on the pupil size.

In some aspects, the techniques described herein relate to a method, wherein the visual property is one or more of a focus, zoom, or visual enhancement to a feature included in the scene.

In some aspects, the techniques described herein relate to a method, further including determining a first baseline pupillary distance for the individual that corresponds to a close focal distance, determining a second baseline pupillary distance for the individual that corresponds to a far focal distance, and wherein calculating the focal distance is based in part on the first baseline pupillary distance and the second baseline pupillary distance.

In some aspects, the techniques described herein relate to a method, wherein calculating the focal distance of the individual is based in part on reference to a user database, the user database including a user-specific correlation between pupillary distance and focal distance.

In some aspects, the techniques described herein relate to a method, wherein the focal distance is verified using object recognition to identify objects included in the scene depicted by the second video feed.

In some aspects, the techniques described herein relate to a method, including: receiving a first video feed including a representation of a facial region of an individual and a second video feed that depicts a scene; determining one or more visual features associated with the individual; calculating a focal distance of the individual based on the one or more visual features; and modifying a visual property of the second video feed based on the focal distance.

In some aspects, the techniques described herein relate to a method, wherein the one or more visual features includes a pupil size of the individual.

In some aspects, the techniques described herein relate to a method, wherein a larger pupil size corresponds to a shorter focal distance and a smaller pupil size corresponds to a longer focal distance.

In some aspects, the techniques described herein relate to a method, wherein calculating the focal distance based on the pupil size is responsive to detection of an environmental context.

In some aspects, the techniques described herein relate to a method, wherein calculating the focal distance of the individual is based in part on reference to a user database, the user database including one or more user-specific correlations between the one or more visual features and focal distance.

The invention claimed is:

1. A computing device, comprising:
   a video capture device that includes a front camera of the computing device; and
   a content control module implemented at least partially in hardware to:
   receive a first video feed including a representation of a facial region of an individual via the video capture device;
   receive a second video feed from a rear camera of the computing device that depicts a scene;
   determine a pupillary distance associated with the facial region of the individual;
   calculate a focal distance of the individual in relation to the scene based on the pupillary distance; and
   modify a visual property of the second video feed based on the focal distance.

2. The computing device as described in claim 1, wherein a longer pupillary distance corresponds to a longer focal distance and a shorter pupillary distance corresponds to a shorter focal distance.

3. The computing device as described in claim 1, wherein the content control module is further configured to:
   determine a first baseline pupillary distance for the individual at a close focal distance;
   determine a second baseline pupillary distance for the individual at a far focal distance; and
   generate a user-specific correlation between the pupillary distance and the focal distance based in part on the first baseline pupillary distance and the second baseline pupillary distance, the user-specific correlation usable to calculate the focal distance.

4. The computing device as described in claim 1, wherein to calculate the focal distance of the individual is based in part on reference to a user database, the user database including a user-specific correlation between one or more visual features associated with the individual and focal distance.

5. The computing device as described in claim 1, wherein the content control module is further configured to determine a pupil size associated with the facial region of the individual, and wherein the focal distance is based in part on the pupil size.

6. The computing device as described in claim 1, wherein the visual property is one or more of a focus, zoom, or visual enhancement to a feature included in the scene.

7. The computing device as described in claim 1, wherein to calculate the focal distance is based in part on a detected environmental context describing one or more features of an ambient setting surrounding the computing device.

8. A method, comprising:
   receiving a first video feed including a representation of a facial region of an individual and a second video feed that depicts a scene;
   determining a pupillary distance associated with the facial region of the individual;

calculating a focal distance of the individual based on the pupillary distance, a longer pupillary distance corresponding to a longer focal distance and a shorter pupillary distance corresponding to a shorter focal distance; and modifying a visual property of the second video feed based on the focal distance.

9. The method as described in claim 8, further comprising determining a pupil size associated with the facial region of the individual, and wherein the focal distance is based in part on the pupil size.

10. The method as described in claim 8, wherein the visual property is one or more of a focus, zoom, or visual enhancement to a feature included in the scene.

11. The method as described in claim 8, further comprising determining a first baseline pupillary distance for the individual that corresponds to a close focal distance, determining a second baseline pupillary distance for the individual that corresponds to a far focal distance, and wherein calculating the focal distance is based in part on the first baseline pupillary distance and the second baseline pupillary distance.

12. The method as described in claim 8, wherein calculating the focal distance of the individual is based in part on reference to a user database, the user database including a user-specific correlation between pupillary distance and focal distance.

13. The method as described in claim 8, wherein the focal distance is verified using object recognition to identify objects included in the scene depicted by the second video feed.

14. A method, comprising:
receiving a first video feed from a front camera of a computing device including a representation of a facial region of an individual and a second video feed from a rear camera of a computing device that depicts a scene;

determining one or more visual features associated with the individual;

calculating a focal distance of the individual based on the one or more visual features; and modifying a visual property of the second video feed based on the focal distance.

15. The method as described in claim 14, wherein the one or more visual features includes a pupil size of the individual.

16. The method as described in claim 15, wherein a larger pupil size corresponds to a shorter focal distance and a smaller pupil size corresponds to a longer focal distance.

17. The method as described in claim 15, wherein calculating the focal distance based on the pupil size is responsive to detection of an environmental context.

18. The method as described in claim 14, wherein calculating the focal distance of the individual is based in part on reference to a user database, the user database including one or more user-specific correlations between the one or more visual features and focal distance.

19. The method as described in claim 14, further comprising validating the focal distance using object recognition by detecting an object included in the second video feed and comparing a distance to the object with the focal distance.

20. The method as described in claim 14, wherein the visual property is one or more of a focus, zoom, or visual enhancement to a feature included in the scene.

* * * * *